(12) United States Patent
Yoshigae

(10) Patent No.: US 8,508,810 B2
(45) Date of Patent: Aug. 13, 2013

(54) IMAGE READING APPARATUS AND IMAGE FORMING APPARATUS

(75) Inventor: Takahisa Yoshigae, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 354 days.

(21) Appl. No.: 12/877,498

(22) Filed: Sep. 8, 2010

(65) Prior Publication Data

US 2011/0063693 A1      Mar. 17, 2011

(30) Foreign Application Priority Data

Sep. 11, 2009   (JP) .................... 2009-210390

(51) Int. Cl.
H04N 1/04       (2006.01)
H04N 1/40       (2006.01)
G02B 26/12      (2006.01)
G06K 7/00       (2006.01)

(52) U.S. Cl.
USPC ........... 358/474; 382/312; 358/483; 358/445; 358/497; 359/226.3

(58) Field of Classification Search
USPC ........ 358/3.01, 521, 474, 1.1–1.9, 1.11–1.18, 358/445, 483, 497; 359/226.3; 382/312
See application file for complete search history.

(56) References Cited

U.S. PATENT DOCUMENTS

| 7,764,405 | B2  | 7/2010 | Yoshigae |
| 2008/0106748 | A1* | 5/2008 | Tsukahara et al. ............. 358/1.1 |
| 2010/0177364 | A1  | 7/2010 | Yoshigae |

FOREIGN PATENT DOCUMENTS

| JP | 04-061560 | 2/1992 |
| JP | 2001-326768 | 11/2001 |
| JP | 2006-222688 A | 8/2006 |
| JP | 2008-113170 | 5/2008 |
| JP | 2008-118366 A | 5/2008 |
| JP | 2010-166314 A | 7/2010 |

OTHER PUBLICATIONS

U.S. Appl. No. 12/877,449, filed Sep. 8, 2010, Yoshigae.
Japanese Office Action (2009-210390) dated May 28, 2013.

* cited by examiner

Primary Examiner — King Poon
Assistant Examiner — Ibrahim Siddo
(74) Attorney, Agent, or Firm — Oblon, Spivak, McClelland, Maier & Neustadt, L.L.P.

(57) ABSTRACT

An image reading apparatus includes: a driving unit that drives a photoelectric conversion element by a clock; a signal generating unit that generates an analog signal; an amplification inversion unit that amplifies an alternating current component of the analog signal with an amplification factor by a setting value that is set from outside, and that switches the alternating current component between inversion and non-inversion; a signal superimposing unit that superimposes the analog image signal on an analog signal that is output from the amplification inversion unit; and a controlling unit that converts analog image signal that is superimposed by the signal superimposing unit into a digital image signal by using the analog-digital converter, and that controls the amplification factor and the inversion and non-inversion of the amplification inversion unit based on a feature amount that appears on the digital image signal.

14 Claims, 11 Drawing Sheets

IMAGE READING APPARATUS AND IMAGE FORMING APPARATUS

CROSS-REFERENCE TO RELATED APPLICATIONS

The present application claims priority to and incorporates by reference the entire contents of Japanese Patent Application No. 2009-210390 filed in Japan on Sep. 11, 2009.

BACKGROUND OF THE INVENTION

1. Field of the Invention

The present invention relates to an image reading apparatus that converts light reflected from an original into analog image signals by a photoelectric conversion element, that converts the obtained analog image signals, to which analog signal processing is applied, into digital image signals by an analog-digital converter, and that outputs the digital image signals, and an image forming apparatus including the image reading apparatus.

2. Description of the Related Art

In recent years, the speed of reading image data has been increased, and the frequency of a reading operation clock is also increased accordingly. Consequently, it is essential to take a countermeasure against electromagnetic interference (EMI) relative to the regulations on electromagnetic wave intensity (such as Federal Communications Commission (FCC) and Voluntary Control Council for Interference by Information Technology Equipment (VCCI)).

In general, a Spread Spectrum Clock Generator (SSCG) is generally used as an effective countermeasure against the EMI. The SSCG is a method for integrally smoothing the EMI spectrum by modulating the frequency of the operation clock within a very small area at a slow cycle rate.

When the SSCG is used in an image reading apparatus, the adverse effect of modulation of the SSCG appears on an image. When the modulation of the SSCG is applied on a drive of a charge-coupled device (CCD) used as a photoelectric conversion element and an operation clock of an analog-digital (A/D) convertor, the offset level of an image varies in synchronization with the modulation cycle of the SSCG, however slight. Accordingly, a streak PP such as a horizontal streak or an orthogonal streak appears on the image (see FIG. 12).

To solve such a problem, for example, Japanese Patent Application Laid-open No. 2008-118366 discloses a technology of removing a variation component in an image signal, and preventing horizontal streaks from appearing.

In Japanese Patent Application Laid-open No. 2008-118366, an image reading apparatus includes a variation removing circuit 112 so as to function to convert incident light into analog image signals by a photoelectric conversion element, to digitalize the analog image signals by an analog-digital converter, and to output the signals. The variation removing circuit 112 drives the photoelectric conversion element 105 with a clock whose frequency is modulated, and superimposes a signal having the opposite phase but the same variation amount as those of the variation of the analog image signal onto an image signal, corresponding to a frequency change of the clock (see FIG. 13).

The variation removing circuit 112 generates a correction signal which is to be superimposed on the image signal and whose amplitude and phase are set in advance, and superimposes the correction signal on the image signal. As an example, the variation removing circuit 112 is capable of changing the bias current of a transistor connected in an emitter follower configuration.

However, in such a conventional technology, the amplitude and the phase of the correction signal to be superimposed on the image signal are set in advance. Accordingly, when the offset variations due to the effect of the SSCG fluctuate among devices, the conventional technology may fail to deal with this situation.

SUMMARY OF THE INVENTION

It is an object of the present invention to at least partially solve the problems in the conventional technology.

According to one aspect of the present invention, there is provided an image reading apparatus that converts light reflected from an original into an analog image signal by a photoelectric conversion element, that converts the obtained analog image signal, to which analog signal processing is applied, into a digital image signal by an analog-digital converter, and that outputs the digital image signal, the image reading apparatus including: a driving unit that drives the photoelectric conversion element by a clock whose frequency is modulated; a signal generating unit that generates an analog signal corresponding to a frequency change of the clock whose frequency is modulated; an amplification inversion unit that is capable of amplifying an alternating current component of the analog signal with an amplification factor by a setting value that is set from outside, and that is capable of switching the alternating current component between inversion and non-inversion; a signal superimposing unit that superimposes the analog image signal on an analog signal that is output from the amplification inversion unit; and a controlling unit that converts analog image signal that is superimposed by the signal superimposing unit into a digital image signal by using the analog-digital converter, and that controls the amplification factor and the inversion and non-inversion of the amplification inversion unit based on a feature amount that appears on the digital image signal.

According to another aspect of the present invention, there is provided an image forming apparatus including the image reading apparatus mentioned above.

According to still another aspect of the present invention, there is provided an image reading apparatus that converts light reflected from an original into an analog image signal by a photoelectric conversion element, that converts the obtained analog image signal, to which analog signal processing is applied, into a digital image signal by an analog-digital converter, and that outputs the digital image signal, the image reading apparatus including: means for driving the photoelectric conversion element by a clock whose frequency is modulated; means for generating an analog signal corresponding to a frequency change of the clock whose frequency is modulated; means for amplification inversion that is capable of amplifying an alternating current component of the analog signal with an amplification factor by a setting value that is set from outside, and that is capable of switching the alternating current component between inversion and non-inversion; means for signal superimposing the analog image signal on an analog signal that is output from the means for amplification inversion; and means for controlling that converts analog image signal that is superimposed by the means for signal superimposing into a digital image signal by using the analog-digital converter, and that controls the amplification factor and the inversion and non-inversion of the means for amplification inversion based on a feature amount that appears on the digital image signal.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be described below in greater detail with reference to the accompanying drawings.

Figure 1:
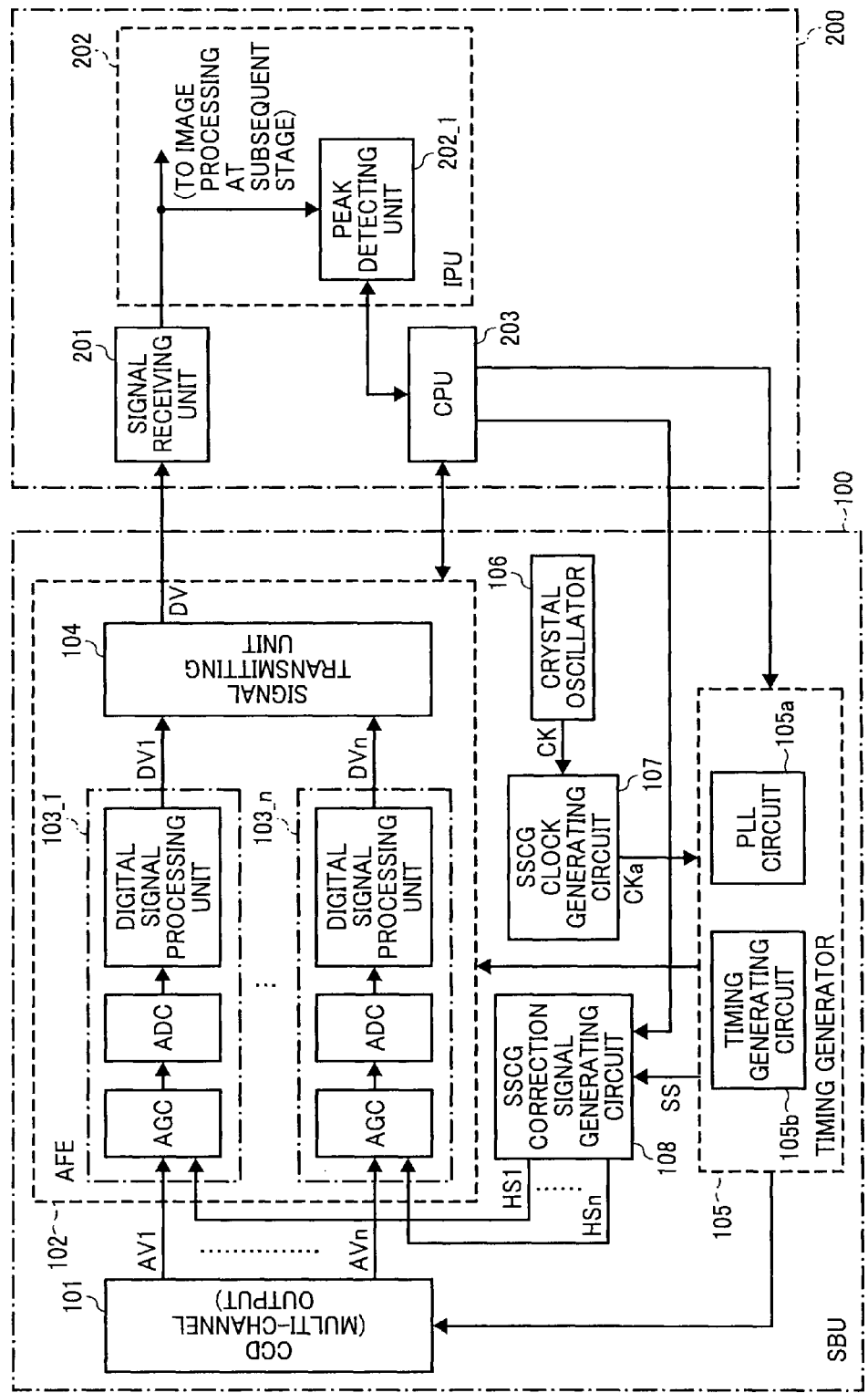
FIG. 1 is a schematic of an example of an essential portion of an image signal processing system of an image reading apparatus according to an embodiment of the present invention.

FIG. 1 is a schematic of an example of an essential portion of an image signal processing system of an image reading apparatus according to an embodiment of the present invention.

The image reading apparatus illustrated in FIG. 1 uses a so-called reduction optical system in which an original to be read is placed on a contact glass, an image surface is scanned by a scanning optical system, and the scanned image surface is converged to a CCD line image sensor 101 in a sensor board unit (SBU) 100. The CCD line image sensor 101 is divided into a plurality (n pieces) of blocks so as to read an image at high speed and the like. Image reading signals from the blocks are output from separate output channels.

Analog processing units 103_1 to 103_n of n pieces in an analog front end (AFE) 102 receive analog image signals AV1 to AVn of n channels that is read and is output from the CCD line image sensor 101.

The analog front end 102 is an application specific integrated circuit (ASIC) for performing analog processing, analog-digital (A/D) conversion processing, and digital signal processing.

Each of the read analog image signals AV1 to AVn, received by any one of the analog processing units 103_1 to 103_n in the analog front end 102, has a difference with an internal operation reference potential (which will be described later). The difference signals are amplified at a predetermined gain by a variable gain amplifier (Auto Gain Control (AGC)) as analog image signals AR1 to ARn (not illustrated), and converted into corresponding digital signals by an analog-digital converter (ADC). Predetermined digital processing is applied to the digital signals by a digital signal processing unit, and the processing result is output to a signal transmitting unit 104 as digital image signals DV1 to DVn.

The signal transmitting unit 104 connects the received digital image signals DV1 to DVn of n channels, and transmits the connected digital image signals DV1 to DVn to a signal receiving unit 201 of a substrate controlling unit 200 at a subsequent stage, as a continuous digital image signal DV of one line.

The gains of variable gain amplifiers of the analog processing units 103_1 to 103_n can be programmably set, to absorb fluctuations of parts of a lamp in the reduction optical system described above, fluctuations of sensitivity of the CCD line image sensor 101, and the like. The gain is adjusted when the power is turned ON, or each time image data is read, so that the digital output remains constant when the reference white level is read, thereby determining a setting value (which is so-called shading correction processing).

The digital signal processing unit 103 performs predetermined digital signal processing (such as gamma correction processing). A Low Voltage Differential Signaling (LVDS) transmitter is used as the signal transmitting unit 104, and for example, an LVDS receiver is used as the signal receiving unit 201.

The digital image signal DV, received by the signal receiving unit 201 is output to a peak detecting unit 201_1 of an image processing unit (IPU) 202. The digital image signal DV is also output to an image processing unit at a subsequent stage, which is not illustrated.

In the sensor board unit 100, a timing generator 105 generates controlling signals for driving the CCD line image sensor 101 and the analog front end 102. The timing generator 105 includes a phase locked loop (PLL) circuit 105a for generating basic clock signals and the like, and a timing generating circuit 105b for generating control signals and the like to drive the CCD line image sensor 101 and the analog front end 102, based on the clock signals and the like (which will be described later) generated by the PLL circuit 105a.

In the present embodiment, an external input clock to the PLL circuit 105a is a clock whose frequency is modulated by the SSCG as a countermeasure against the EMI. Accordingly, all the drive signals generated by the timing generator 105 are modulated by the SSCG. The effect of the modulation of the SSCG leads to an offset variation of the image signal (image data) as described above.

Figure 13:
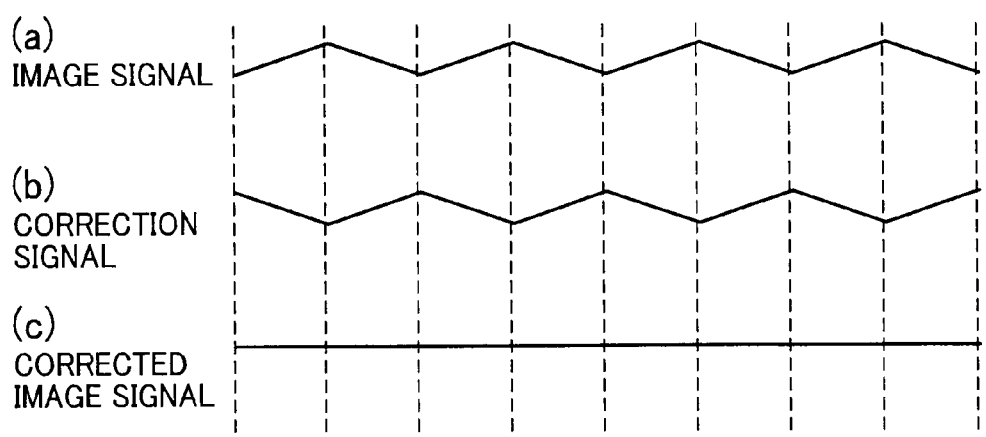
FIG. 13 is a schematic for explaining a method of how an effect of the SSCG on a reading image is improved.

Accordingly, in the present embodiment, the variation is reduced by superimposing a signal having a reverse phase on the image signal so as to reduce the offset variation of the image signal due to the effect of the SSCG described above (see FIG. 13).

The known method, disclosed in Japanese Patent No. 2008-118366 as described above, is a method in which the amplitude of the correction signal having a reverse phase is set in advance. Accordingly, an individual fluctuation of the offset variation amount cannot be adjusted. Because the phase of the correction signal is limited to a reversed phase, switching is not possible.

Consequently, in the present embodiment, the DAC is used in a portion where the correction signals are generated. As a result, it is possible to perform adjustment so as to absorb the individual fluctuation and to switch the polarity of the correction signal (which will be described later).

As illustrated in FIG. 1, because the output from the CCD line image sensor 101 is multi-channel (generally, six channels or 12 channels from a color CCD line image sensor), the variation amounts due to the effect of the SSCG fluctuate among the channels. Accordingly, each channel must be corrected separately. Consequently, in the present embodiment, the variation due to the effect of the SSCG at each channel is separately corrected, by using a general DAC with multi-channel outputs for the DAC (which will be described later).

However, in general, input-output response characteristics of the general DAC are slow, although it is inexpensive and readily available. In the present embodiment, the slow input-output characteristics of the general DAC described above are compensated, by giving a frequency characteristic to a peripheral circuit portion used for operating the general DAC. Accordingly, variation due to the effect of the SSCG can be corrected, without using an expensive high-speed operating DAC (which will be described later).

As one of the characteristics of the general DAC, the relation between the setting value and the output voltage is in a linear relation. In the present embodiment, a setting value used for correcting streaks due to the effect of the SSCG is calculated, by an algorithm using the linearity (which will be described later).

Referring back to FIG. 1, a clock signal CKa is used as the reference clock signal to be fed into the PLL circuit 105a. The clock signal CKa is obtained by feeding a signal CK output from a crystal oscillator 106 into an SSCG clock generating circuit 107, and by applying frequency modulation of the SSCG (hereinafter, referred to as SSCG modulation) on the signal CK generated by the SSCG clock generating circuit 107.

Accordingly, the effect of the SSCG modulation appears on the read analog image signals AV1 to AVn of the channels output from the CCD line image sensor 101, and as described above, the read analog image signals AV1 to AVn turn into signals whose levels change periodically at a certain width.

An SSCG correction signal generating circuit 108 generates correction signals HS1 to HSn for correcting the read analog image signals AV1 to AVn based on the signal output from the timing generator 105, so as to reduce the effect due to the SSCG modulation from the read analog image signals AV1 to AVn. The correction signals HS1 to HSn are output into the analog processing units 103_1 to 103_n of the analog front end 102.

In a substrate controlling unit 200, a peak detecting unit 202_1 detects a peak-bottom difference signal that indicates the difference between a peak value and a bottom value of the digital image signal DV to be fed for each channel of the read analog image signals AV1 to AVn. The detection value is output to a central processing unit (CPU) 203 in the substrate controlling unit 200.

The CPU 203 controls the operation performed by the substrate controlling unit 200 and operations performed by the elements provided on the sensor board unit 100. More specifically, the CPU 203 controls the operations performed by the timing generator 105 and the analog front end 102. As to the generation of SSCG correction signals, the CPU 203 controls the operation performed by the SSCG correction signal generating circuit 108, based on the peak-bottom difference signal of each channel received from the peak detecting unit 202_1. The CPU 203 also performs setting so that the peak detecting unit 202_1 can detect a peak-bottom difference.

Figure 2:
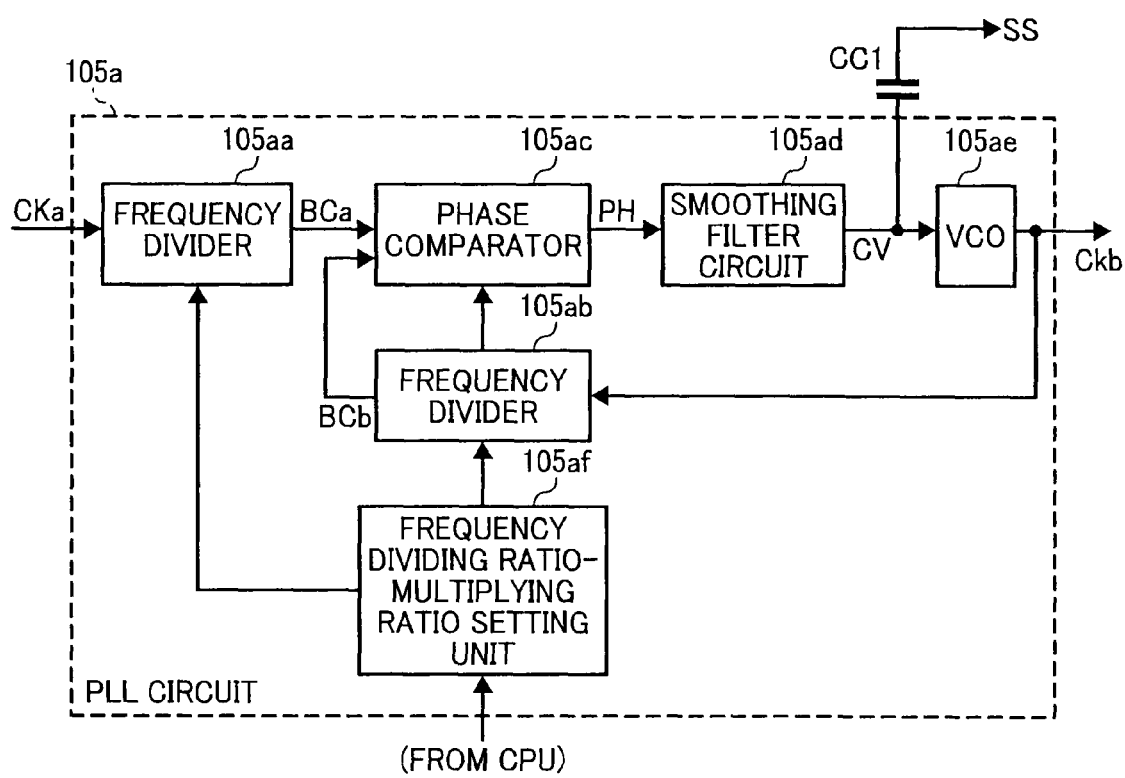
FIG. 2 is a schematic of an example of a PLL circuit.

FIG. 2 is a schematic of the PLL circuit 105a included in the timing generator 105.

As illustrated in FIG. 2, the PLL circuit 105a in the present embodiment can externally set the frequency dividing ratio and the multiplying ratio.

In the PLL circuit 105a, a signal BCa obtained by frequency dividing of the clock signal CKa received externally (SSCG modulated) by a frequency divider 105aa and a signal BCb obtained by frequency dividing of an inner clock signal CKb output from a voltage controlled oscillator (VCO) 105ae, which will be described later, by a frequency divider 105ab, are both fed into a phase comparator 105ac. The phase comparator 105ac performs phase comparison between the signal BCa and the signal BCb, and changes the duty of a pulse PH to be output based on the phase comparison result.

A smoothing filter circuit 105ad receives the pulse PH, integrates the pulse PH, and converts the pulse PH into a voltage CV depending on the duty of the pulse PH. In other words, the smoothing filter circuit 105ad acts as a frequency-voltage converting unit that converts the pulse PH into the voltage CV.

The voltage CV is fed into the VCO 105ae. The VCO 105ae outputs a pulse having a frequency corresponding to the received voltage CV. The output pulse of the VCO 105ae is output into external equipment as the inner clock signal CKb and also fed back to the frequency divider 105ab.

The frequency dividing ratio and the multiplying ratio of the frequency dividers 105aa and 105ab are set by a frequency dividing ratio-multiplying ratio setting unit 105af controlled by the CPU 203. The CPU 203 can change the frequency of the inner clock signal CKb output from the PLL circuit 105a, by appropriately setting the frequency dividing ratios of the frequency dividers 105aa and 105ab. The CPU 203 can change the frequency of a timing signal created based on the inner clock signal CKb, such as a line sync signal (line synchronization signal) that indicates the time when the CCD line image sensor 101 starts reading one line. As a result, it is possible to change the one line reading cycle for reading the read analog image signal AV (AV1 to AVn).

Only an alternating current component of the output voltage CV of the smoothing filter circuit 105ad is fed into the SSCG correction signal generating circuit 108 as an analog signal SS through an alternating current coupling capacitor CC1.

In the structure of the PLL circuit 105a, the duty of the pulse signal PH, output from the phase comparator 105ac, changes based on the phase comparison result; and the voltage level of the signal CV obtained by smoothing the pulse signal PH changes, corresponding to the duty of the pulse signal PH (frequency-voltage conversion as described above).

As in this case, when the SSCG modulated clock signal CKa is fed into the PLL circuit 105a, the input voltage CV into the VCO 105ae after being smoothed is turned into a voltage signal that varies in synchronization with the modulation cycle of the SSCG. Accordingly, by extracting the voltage signal through the alternating current coupling capacitor CC1, the signal is turned into a signal from which a direct current component is removed and which only includes an alternating current component. Consequently, the signal that has passed through the capacitor CC1 and that only includes the alternating current component is used as the analog signal SS in synchronization with the SSCG modulation cycle.

Figure 3:
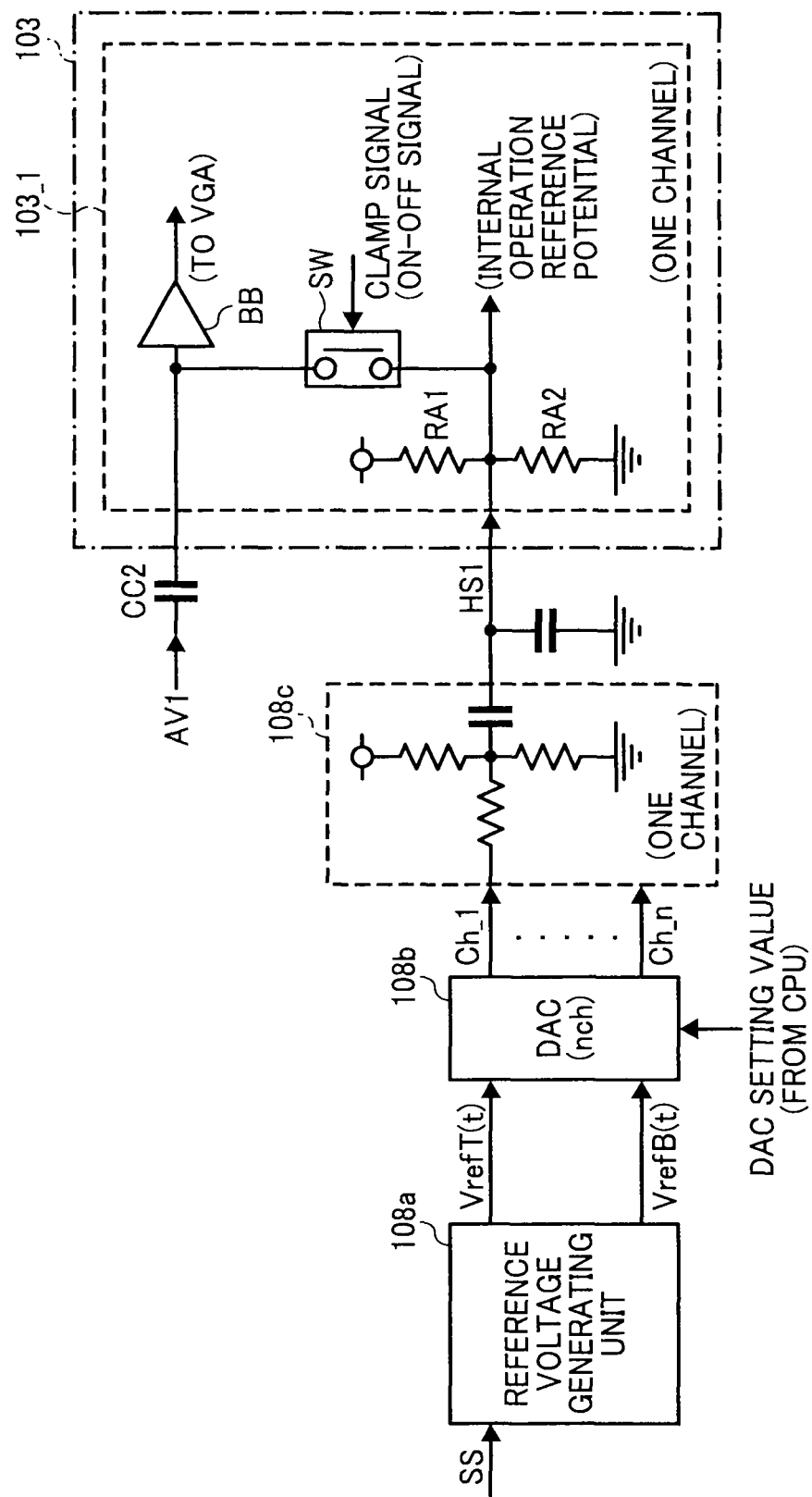
FIG. 3 is a schematic of an example of an SSCG correction signal generating circuit.
Figure 4:
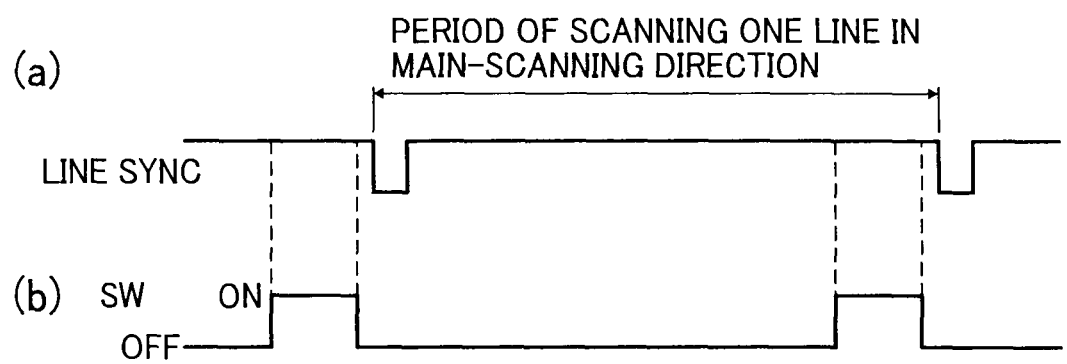
FIG. 4 is a timing chart for explaining an operation of superimposing a correction signal onto an internal operation reference potential of an AFE.

The SSCG correction signal generating circuit 108 that generates the correction signals HS1 to HSn will now be described. FIG. 3 is a schematic of an example of the SSCG correction signal generating circuit 108.

The SSCG correction signal generating circuit 108, based on the analog signal SS described above, includes a reference voltage generating unit 108a, a digital-analog converter (DAC) 108b, and an output circuit 108c. The reference voltage generating unit 108a forms reference signals VrefT(t) and VrefB(t) of the DAC 108b having a plurality of output channels, based on the analog signal SS described above. The DAC 108b includes the output channels, from which analog signals corresponding to the reference signals VrefT(t) and VrefB(t), and the DAC setting values of the channels received from the CPU 203 are output to the channels. The output circuit 108c outputs the output signals from the channels of the DAC 108b to a device at a subsequent stage. A general DAC device can be used as the DAC 108b.

The DAC 108b sets the signal level of the analog signal output from each of the channels, corresponding to the digital signal fed into the channel, based on the received reference signals VrefT(t) and VrefB(t).

In the present embodiment, the DAC 108b, having the same number of channels as those of the CCD line image sensor 101, is used as a generating unit of correction signals in the SSCG correction signal generating circuit 108. Accordingly, the correction signals generated corresponding to the channels of the CCD line image sensor 101 can be amplified at an arbitrary amplification factor; and it is possible to switch the correction signal between inversion and non-inversion (details will be described later).

An output signal from each of the channels of the DAC 108b is fed into a clamp potential input end for setting the internal operation reference potential of any one of the analog processing units 103_1 to 103_n of the corresponding channel of the analog front end 102 through the output circuit 108c.

Accordingly, the DAC setting value fed into the DAC 108b is set, so that the DAC setting value has the same amplitude but reversed phases as those of the offset variation of the analog image signal generated due to the effect of the SSCG. Consequently, the offset variation of the analog image signal can be cancelled out, and the offset variation of the analog image signal generated due to the effect of the SSCG can be corrected (details will be described later).

Voltage-divided resistances RA1 and RA2 for setting a clamp potential are provided in each of the analog processing units 103_1 to 103_n. A voltage-divided value of the voltage-divided resistances RA1 and RA2 is supplied to an inner circuit of any one of the analog processing units 103_1 to 103_n, as the internal operation reference potential.

As the output signals from the channels of the DAC 108b described above, the voltage, supplied to the clamp potential input end of each of the analog processing units 103_1 to 103_n externally, acts as a superimposed potential component for displacing the internal operation reference potential.

The analog processing unit 103_1 receives the read analog image signal AV1 from one of the channels through an alternating current coupling capacitor CC2; and the input signal is fed into the analog processing unit 103_1 through a buffer amplifier BB. The input end of the buffer amplifier BB is also connected to the clamp potential input end through a clamp switch SW.

Figure 6A:
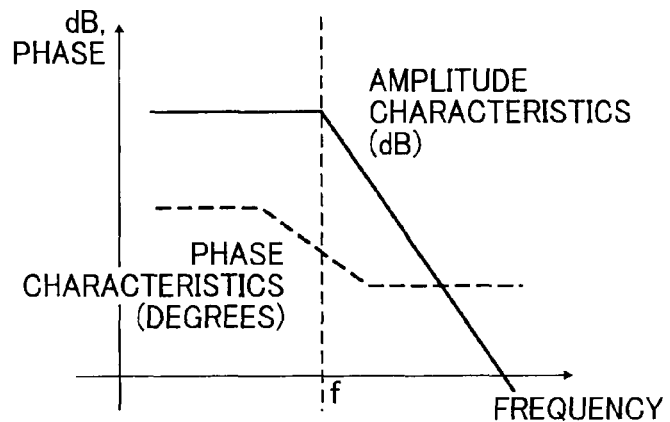
FIGS. 6A to 6C are graphs for explaining the improvement on frequency characteristics of a DAC.
Figure 6B:
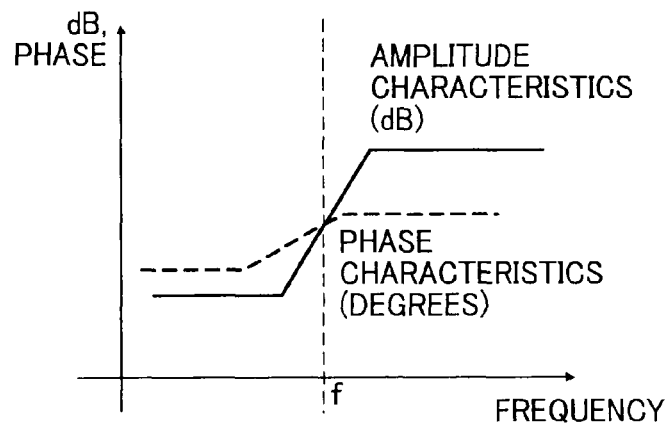

As illustrated in FIGS. 6A and 6B, the clamp switch SW is turned on for a predetermined period of time to detect a black level reference value during a period of scanning one line in the main-scanning direction by a clamp signal. Accordingly, the voltage at the input end of the buffer BB is stored in the analog processing unit 103_1 as a black level reference value.

During a period of scanning one line in the main-scanning direction after the clamp switch SW is turned off, the black level reference value, detected by a black level reference value detecting unit, is used in the analog processing unit 103_1 as a black level reference value of the read analog image signal AV1.

In other words, in any one of the analog processing units 103_1 to 103_n, a correction signal (output signal from each of the channels of the DAC 108b) is superimposed on the clamp potential input end. Accordingly, the correction signal is superimposed on the internal operation reference potential. In each of the analog processing units 103_1 to 103_n, a difference signal between the internal operation reference potential and the read analog image signal AV to be fed is formed as any one of the analog image signals AR1 to ARn (not illustrated). Each of the analog image signals AR1 to ARn is converted into a digital image signal DV by the ADC, after being amplified by the AGC with the analog gain.

In this manner, each of the analog image signals AR1 to ARn, processed by any one of the analog processing units 103_1 to 103_n, is a difference signal between the internal operation reference potential and the read analog image signal AV. Accordingly, when the correction signal is superimposed on the internal operation reference potential as described above, the difference between the internal operation reference potential and the read analog image signal AV varies, based on the signal component of the superimposed correction signal. As a result, the similar effect as when the correction signal is superimposed on the read analog image signal AV is exerted on the analog image signal AR (AR1 to ARn). Consequently, the analog image signal AR is a signal in which the offset variation of the read analog image signal AV is corrected, and from which the effect of the SSCG modulation is removed.

Figure 5:
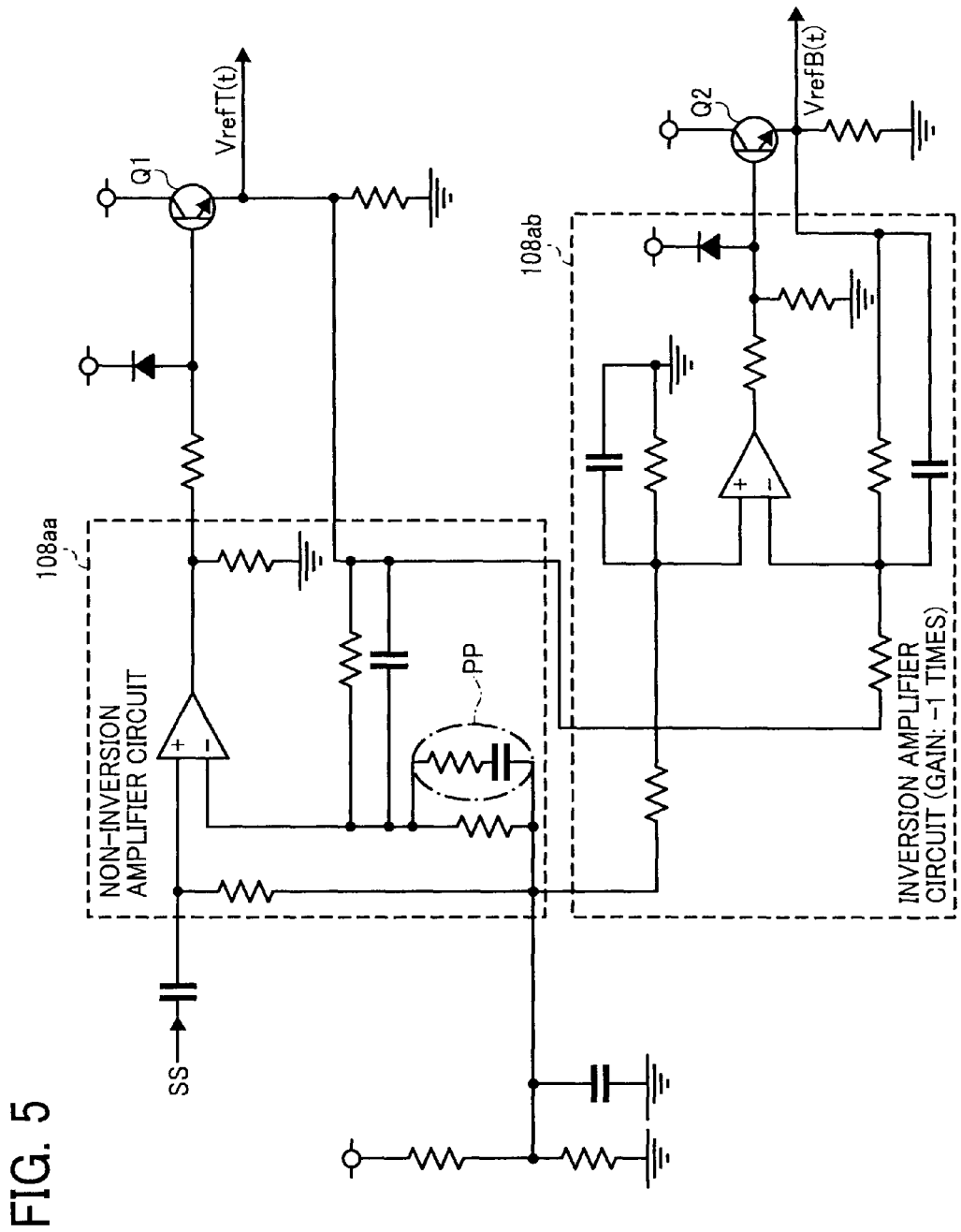
FIG. 5 is a circuit diagram of an example of a reference voltage generating unit.

Referring back to FIG. 3, the reference voltage generating unit 108a generates reference potentials (VrefT(t) and VrefB(t)) of the DAC 108b from the analog signal SS output from the PLL circuit 105a of the timing generator 105, and supplies the reference potentials (VrefT(t) and VrefB(t)) to the DAC 108b. At this time, as illustrated in FIG. 5, the alternating current components of the reference potential VrefT(t) and the reference potential VrefB(t) are generated as signals having the same amplitude but reversed phases.

The reference voltage generating unit 108a will now be described. FIG. 5 is a circuit diagram of an example of the reference voltage generating unit 108a.

In the reference voltage generating unit 108a, the analog signal SS extracted from the PLL circuit 105a has a very small amplitude. Accordingly, the analog signal SS is amplified by a non-inversion amplifier circuit 108aa and an inversion amplifier circuit 108ab, and is supplied as the reference potentials (VrefT(t) and VrefB(t)) of the DAC 108b.

The non-inversion amplifier circuit 108aa is an amplifier circuit with fixed gain using an operational amplifier. A phase compensation circuit PP (which will be described later), formed of a series circuit of a resistance R and a capacitor C, is connected in parallel with a resistance for determining the amplification factor of the gain. An output signal of the non-inversion amplifier circuit 108aa is added to the DAC 108b as the reference potential VrefT(t), in a state on which a predetermined offset voltage (fixed value) is superimposed through a transistor emitter follower circuit Q1.

An output voltage of the non-inversion amplifier circuit 108*aa* is inverted and amplified by the inversion amplifier circuit 108*ab* in which the gain is set to −1 times. The output signal of the inversion amplifier circuit 108*ab* is added to the DAC 108*b*, as the reference potential VrefB(t), in a state on which a predetermined offset voltage (fixed value) is superimposed through a transistor emitter follower circuit Q2. The inversion amplifier circuit 108*ab* is also an amplifier circuit with fixed gain (in this case, gain is −1 times) using the operational amplifier.

In other words, this reference voltage generating unit 108*a* amplifies an analog signal SS extracted from the timing generator 105 using the non-inversion amplifier circuit 108*aa* at a certain fixed gain so as to supply the signal obtained by superimposing an offset voltage onto the analog signal amplified by the non-inversion amplifier circuit 108*aa* to the DAC 108*b*, as the reference voltage VrefT(t).

A signal, obtained by superimposing an offset voltage on the signal whose phase is obtained by inverting the phase of the signal of the reference voltage VrefT(t) by the inversion amplifier circuit 108*ab*, is supplied to the DAC 108*b* as the reference voltage VrefB(t). Here, the phase is inverted by an inversion amplifier circuit in which the gain of an operational amplifier is −1 times.

In this manner, signals, having the same phase and the reversed phase as that of the alternating current signal that varies in synchronization with the cycle of the SSCG modulation, are fed to VrefT(t) and VrefB(t) that are the reference voltages of the DAC 108*b*. When the CPU 203 performs the DAC setting (to set a digital input value applied to the DAC 108*b*), it is possible to obtain a correction signal with an arbitrary amplitude in synchronization with the modulation cycle of the SSCG.

The correction signal will now be described.

Output voltage from the DAC 108*b* is expressed by Equation (I):

$$V\text{dac\_out}(t) = (V\text{refT}(t) - V\text{refB}(t)) \times \text{Dac\_set/FullScale} + V\text{refB}(t) \quad (I)$$

Dac_set: setting value for the DAC (0 to 255 at 8 bits)
FullScale: full scale value of the DAC (255 at 8 bits)
VrefT(t): upper reference potential of the DAC
VrefB(t): lower reference potential of the DAC
α(t): analog signal (alternating current signal) SS extracted from the PLL portion after being amplified
Vdac_out(t): DAC output The alternating current components of the two reference potentials have the same amplitude but reversed phases.

$$V\text{refT}(t) = V\text{refT\_dc} + \alpha(t)$$

$$V\text{refB}(t) = V\text{refB\_dc} - \alpha(t)$$

*VrefT_dc and VrefB_dc are Direct Current Components. Accordingly, Equation (I) is expressed as follows:

$$V\text{dac\_out}(t) = (\alpha(t) + \alpha(t)) \times \text{Dac\_set/FullScale} - \alpha(t) + (V\text{refT\_dc} - V\text{refB\_dc}) \times \text{Dac\_set/FullScale} + V\text{refB\_dc}$$

The alternating current component (Vdac_out(t)_AC) of a signal Vdac_out(t) in the first term of the right-hand side of this Equation indicates that a signal capable of setting the amplitude and polarity by the DAC setting value of the DAC 108*b* can be obtained.

$$V\text{dac\_out}(t)\_\text{AC} = 2\alpha(t) \times \text{Dac\_set/FullScale} - \alpha(t) = (2 \times \text{Dac\_set/FullScale} - 1) \times \alpha(t)$$

For example, when the DAC 108*b* is set at 8 bits,
At Set:255, Vdac_out(t)_AC=α(t)
At Set:128, Vdac_out(t)_AC≅0
At Set:0, Vdac_out(t)_AC=−α(t)

Accordingly, arbitrary setting and switching between inversion and non-inversion are possible.

If a general DAC device, with multi-channel for setting a DAC setting value through serial communication, is used as the DAC 108*b*, the phase of the correction signal obtained as an output signal of the DAC 108*b* is delayed, because the response characteristics of the output change relative to the change of the reference voltages VrefT(t) and VrefB(t) are slow.

Accordingly, the slow response characteristics of the DAC 108*b* are compensated by increasing the amplification factor of the high-frequency component and by giving a frequency characteristic so as to advance the phase, in a portion of the reference voltage generating unit 108*a* that generates the reference potentials VrefT(t) and VrefB(t) for the DAC 108*b*.

In the present embodiment, in the non-inversion amplifier circuit 108*aa* illustrated in FIG. 5, the amplification factor of the high-frequency component is increased and the characteristic to advance the phase is given by connecting the phase compensation circuit PP (which will be described later) in parallel with the resistance portion for determining the amplification factor of the gain.

Figure 6C:
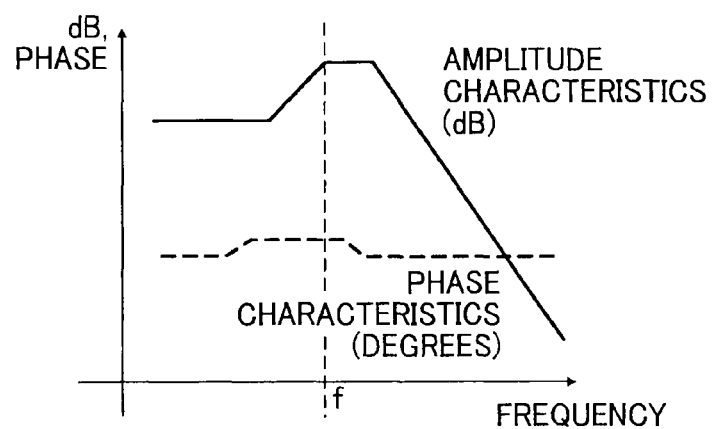

FIG. 6A is an example of the frequency characteristics of the DAC 108*b*. FIG. 6B is the frequency characteristics of the Vref supply circuit (reference voltage generating unit 108*a*), when the phase compensation circuit PP is connected in parallel. FIG. 6C is an example of the frequency characteristic when the DAC 108*b* and the Vref supply circuit (reference voltage generating unit 108*a*) are combined.

As illustrated in FIG. 6C, in the high-frequency component, the amplification factor is increased and the phase is advanced due to the effect of the capacitor component of the phase compensation circuit PP. As the frequency characteristics, the resistance of the phase compensation circuit PP and the constant of the capacitor are set in advance based on the response characteristics of the DAC 108*b*.

In this manner, the phase delay of the DAC can be compensated even when a DAC with slow response characteristics is used, by giving a frequency characteristic to the supply circuit portions (reference voltage generating unit 108*a*) of the reference potentials VrefT(t) and VrefB(t).

An algorithm for calculating a DAC setting value in the present embodiment will now be described.

Streaks on an image due to the effect of the SSCG will now be described.

The streaks due to the effect of the SSCG appear, as described above, because when the SSCG is used as a countermeasure against the EMI, the offset level of the read analog image signal AV varies in a cycle in synchronization with the modulation cycle of the SSCG, however slight.

The degree of effect of the SSCG can be expressed by using a difference amount between the peak value and the bottom value of the distribution of the offset level of the read analog image signal AV in the main-scanning direction, as a feature amount of the streak image due to the effect of the SSCG. This is because, the peak-bottom difference becomes zero if the variation due to the effect of the SSCG does not occur, and the peak-bottom difference increases as the variation due to the effect of the SSCG is increased.

Figure 7A:
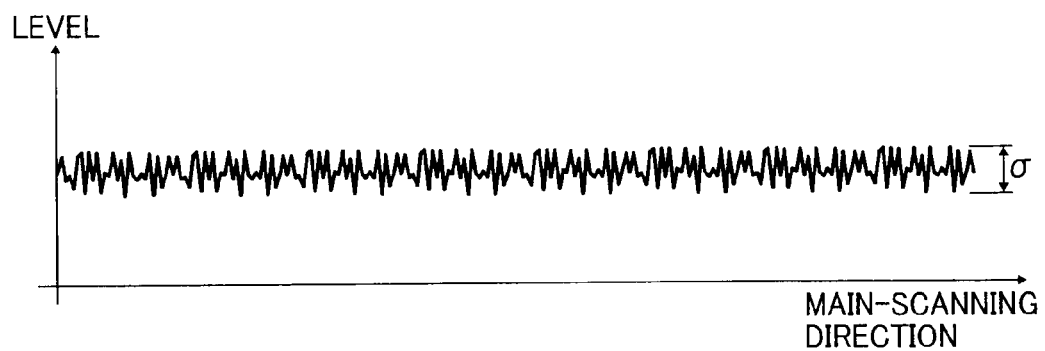
FIGS. 7A and 7B are schematics for explaining a random noise included in an image reading signal.
Figure 7B:
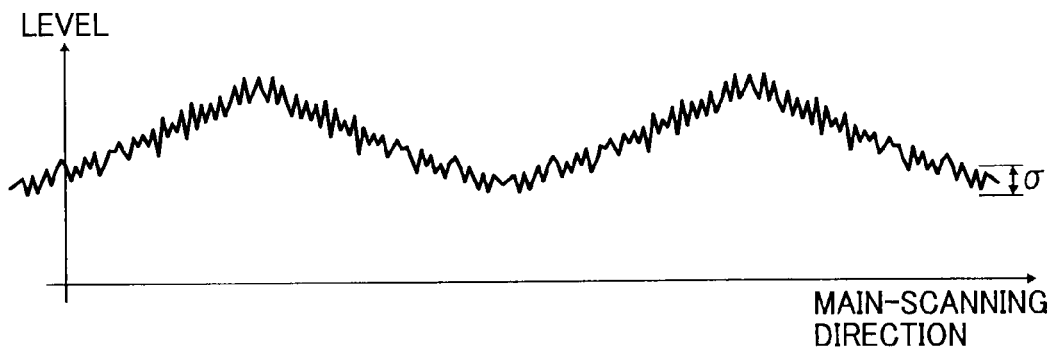

However, the read analog image signal AV to be processed in the present embodiment is output from the CCD line image sensor 101, and includes random noise. Because the peak-bottom difference is the feature amount including a random noise component, even if the variation due to the effect of the SSCG does not occur, a random noise component σ is detected as a peak-bottom difference. FIG. 7A is a schematic when a value of the peak-bottom difference due to the effect of the SSCG is zero. FIG. 7B is a schematic when a value of the peak-bottom difference due to the effect of the SSCG is not zero. Accordingly, when detecting the peak-bottom difference, it is preferable to reduce the effect of the random noise component σ.

Here, it is important to detect the relative size of the read analog image signal AV than detecting the absolute value of the peak-bottom difference. Because the digital image signal DV is basically obtained by analog-digital converting of the read analog image signal AV, a value of the digital image signal DV includes a digital value corresponding to an analog value of the offset component and random noise component included in the read analog image signal AV. Accordingly, calculation of the peak-bottom difference of the digital image signal DV is equivalent to detecting the relative size of the peak-bottom difference of the read analog image signal AV. Consequently, in the present embodiment, the peak-bottom difference of the digital image signal DV is detected, and the effect of the SSCG is estimated based on the result.

Figure 8A:
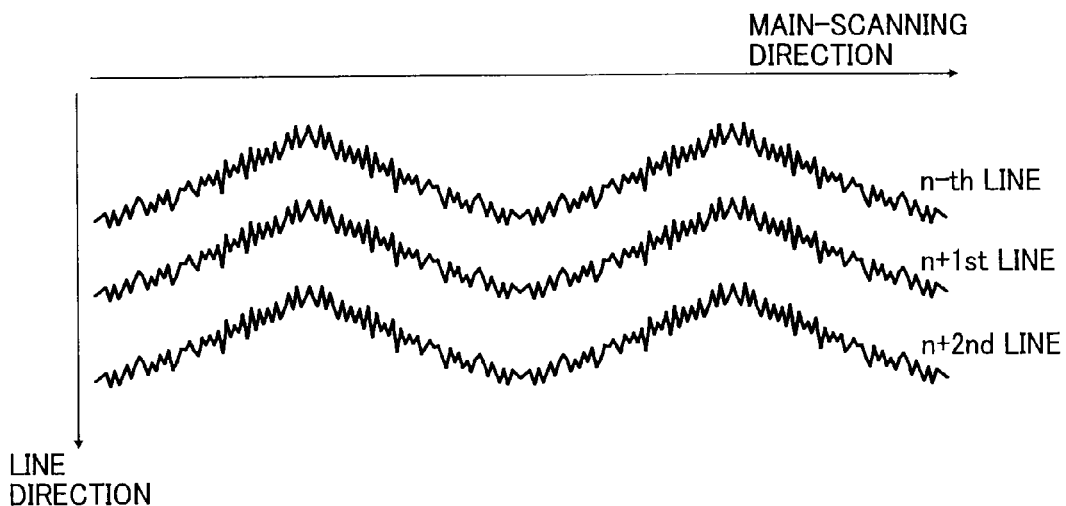
FIGS. 8A and 8B are schematics for explaining an example of a method for detecting a peak-bottom difference in which a random noise component is reduced.
Figure 8B:
Figure 9A:
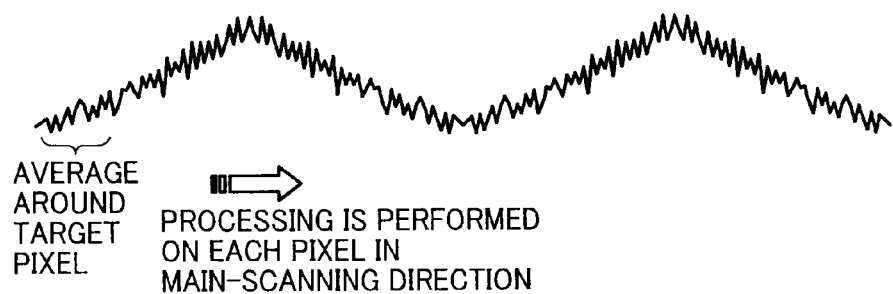
FIGS. 9A and 9B are schematics for explaining another example of a method for detecting a peak-bottom difference in which a random noise component is reduced.
Figure 9B:

As a method for detecting a peak-bottom difference from which the random noise component is reduced, there is a method for detecting a peak-bottom difference after setting one line cycle in the main-scanning direction to an integral multiple of the SSCG modulation cycle, and as illustrated in FIGS. 8A and 8B, performing averaging processing on a plurality of lines of each pixel of a signal to be read (digital image signal DV). As another method for detecting a peak-bottom difference from which a random noise component is reduced, as illustrated in FIGS. 9A and 9B, there is a method for detecting a peak-bottom difference after applying a moving average on the pixels of the signal to be read (digital image signal DV) in the main-scanning direction.

By using any one of the detecting methods, the peak detecting unit 202_1 detects a peak-bottom difference, and by using the detected result, a DAC setting value of the DAC 108b for determining a correction signal is calculated. In this case, the peak detecting unit 202_1 feeds a digital image signal DV. Accordingly, to detect a peak-bottom difference by using the method in FIGS. 8A and 8B, a peak-bottom difference is detected after averaging processing is performed on a plurality of lines of each pixel of the digital image signal DV to be fed. To detect a peak-bottom difference by using the method in FIGS. 9A and 9B, a peak-bottom difference is detected after the moving average is applied on the pixels of the digital image signal DV to be fed in the main-scanning direction.

The detections such as these may only be performed on a predetermined range, instead of performing on all the points of the line to be read. To detect a peak-bottom difference by the peak detecting unit 202_1, the CPU 203 performs setting necessary to detect a peak-bottom difference. For example, when the method in FIGS. 8A and 8B is used, the CPU 203 sets the number of lines used to calculate the average value, and when the method in FIGS. 9A and 9B is used, the CPU 203 sets the number of pixels in the main-scanning direction to which moving average is applied.

An algorithm for calculating a DAC setting value will now be described.

As an algorithm for calculating the DAC setting value, for example, a DAC setting value obtained by detecting a peak-bottom difference while gradually updating the DAC setting value of the DAC 108b until the peak-bottom difference eventually becomes minimal, or a DAC setting value in which the peak-bottom difference is equal to or less than a constant threshold level, may be set as a DAC setting value used as a correction signal.

However, if such an algorithm is used, the detection of the peak-bottom difference and the update of the DAC setting value of the DAC 108b need to be repeated, thereby requiring a long processing time. Because the peak-bottom difference is reduced as the DAC setting value of the DAC 108b is brought closer to an optimal value, the degree of effect of the random noise component is increased. Accordingly, it is difficult to obtain an optimal value quickly.

Consequently, as an algorithm of the present embodiment, the following algorithm in which the number of detection times and the effect of random noise are reduced is provided.

Figure 10A:
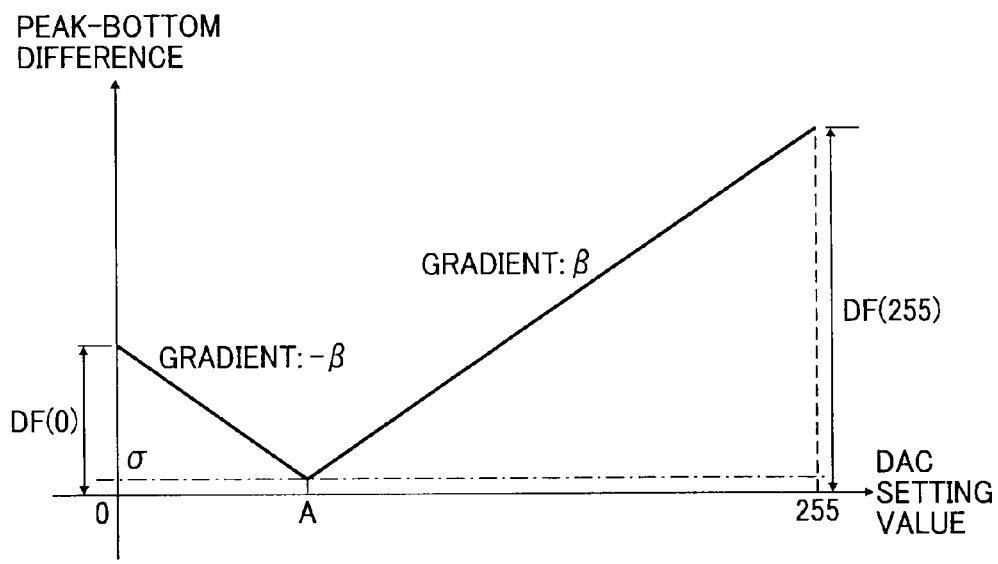
FIGS. 10A and 10B are graphs for explaining a relation between a peak-bottom difference and DAC setting values while a correction signal is superimposed on image data varied due to the effect of the SSCG.

In the structure of the present embodiment, FIG. 10A is a graph of a relation between the DAC setting values and the peak-bottom difference at that time, while the correction signal is superimposed on image data varied due to the effect of the SSCG.

For descriptive purposes, FIG. 10A is a graph when the DAC has a setting range of 8 bits.

In the graph, the peak-bottom difference becomes minimal at a setting value A. Accordingly, it is understood that the setting value A is the optimal value for a DAC setting value used to cancel the variation due to the effect of the SSCG.

In other words, as described above, because the relation between the DAC setting value of the DAC 108b and the output is in a linear relation, if the DAC setting value of the DAC 108b is increased from zero, the peak-bottom difference is reduced linearly by a gradient of $-\beta$ and increased by a gradient of $\beta$ before and after the setting value A. Because the peak-bottom difference is being detected, the peak-bottom difference is reduced and increased before and after the setting value A. However, the size of variation remains constant at $\beta$.

Figure 10B:
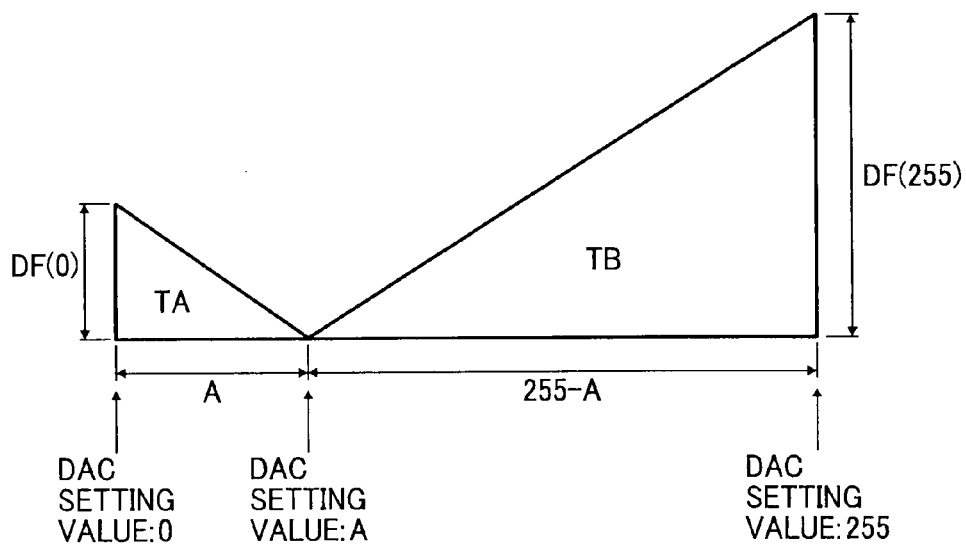

Upon viewing FIG. 10A graphically, as illustrated in FIG. 10B, the magnitudes of the gradients of a triangular TA formed at the left side of the setting value A and a triangular TB formed at the right side of the setting value A are both $\beta$. Accordingly, the triangular TA and the triangular TB are in a similar (homothetic) relation.

Because the triangular TA and the triangular TB are similar, a value of the setting value A is calculated from the ratio between a peak-bottom difference DF (0) (=$\Delta\_0$) at the setting value of 0, and a peak-bottom difference DF (255) (=$\Delta\_255$) at the setting value of 255, as Equation (II).

$$\text{setting value } A = 255 \times \Delta\_0 / (\Delta\_0 + \Delta\_255) \quad \text{(II)}$$

In this case, the setting value A that is the optimal value for the DAC setting value is obtained by Equation (II). Accordingly, there is no need to detect a peak-bottom difference while repeating the update of the DAC setting value of the DAC 108b, and the setting value A can be calculated by just detecting the peak-bottom difference twice, while the DAC setting value of the DAC 108b is being changed. Consequently, it is possible to obtain an optimal value for the DAC setting value at a very short time.

The peak-bottom difference of $\Delta\_0$ at the setting value of 0 and the peak bottom difference of $\Delta\_255$ at the setting value of 255 are both sufficiently large amounts relative to the random noise component σ (see FIG. 10A). Accordingly, the optimal value for the DAC setting value is least affected by the random noise component σ.

In the description above, the peak-bottom difference of $\Delta\_0$ and the peak-bottom difference of $\Delta\_255$ detected at the setting value of 0 and the setting value of 255 are used as the DAC setting value. However, any setting values can be used as long as the effect of the random noise σ relative to the detection value of the peak-bottom difference is small.

Figure 11:
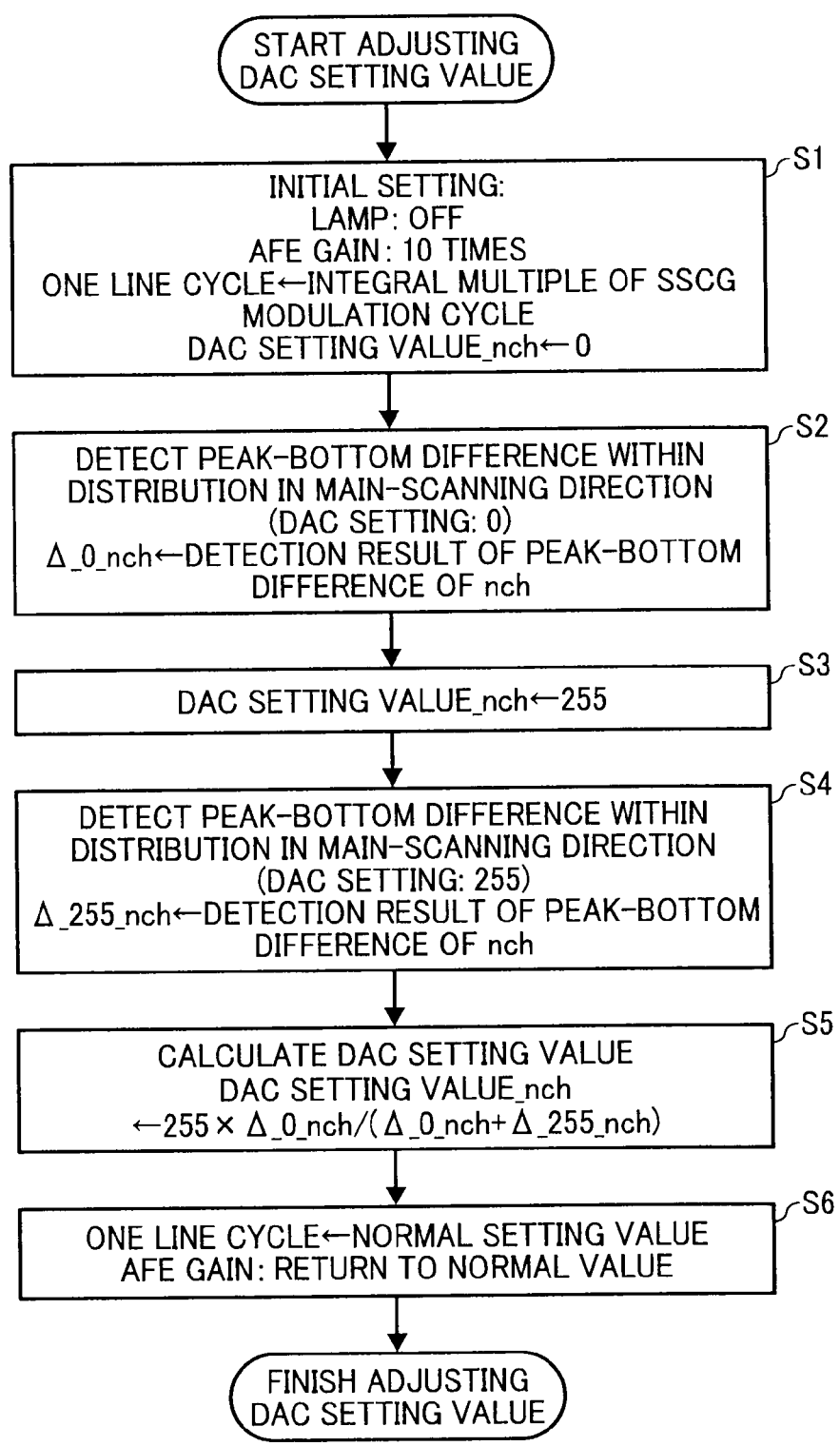
FIG. 11 is a flowchart of an example of a process while a CPU 203 of a substrate controlling unit 200 calculates a DAC setting value.
Figure 12:
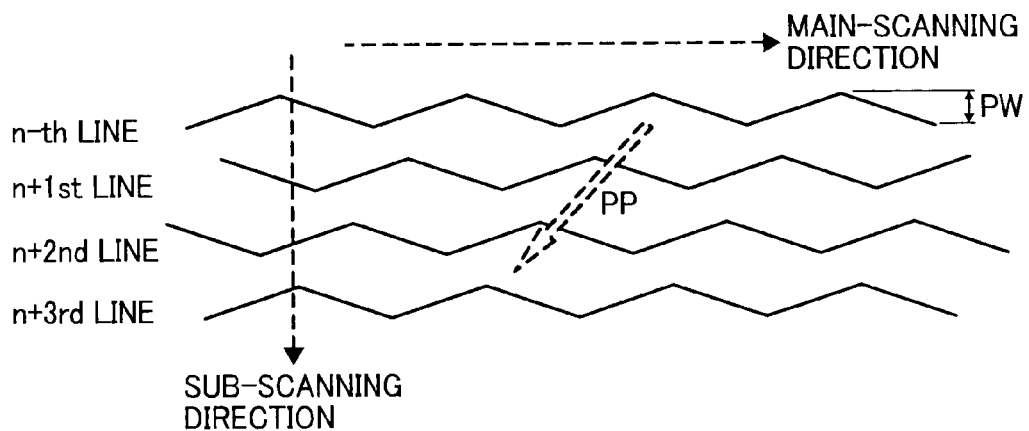
FIG. 12 is a schematic for explaining how the SSCG on effects on a reading image.

FIG. 11 is a flowchart of an example of a process when the CPU 203 of the substrate controlling unit 200 calculates a DAC setting value based on the algorithm described above.

In the process described with reference to FIG. 11, the DAC 108b has 8-bit gradation, and uses 0 and 255 as setting values for calculation. The random noise reduction method is performed by executing averaging processing in a pixel unit as illustrated in FIGS. 8A and 8B.

The initial setting is to be carried out at first, thereby setting variables and conditions (Step S1).

lamp←OFF
    AFE gain←ten times
    one line cycle←set to integral multiple of SSCG modulation cycle
    DAC setting value_nch←0
    *Explanation of Variables and Constants
    lamp: to detect the offset variation due to the effect of the SSCG, the lamp is turned OFF, and reading is carried out in the dark.

AFE gain: set to a state in which the amplification factor of the analog image signal is increased by 10 times, thereby increasing the detection sensitivity.

DAC setting_nch: DAC setting value for nch of the DAC 108b. To set the correction signal, the adjustment starts from a state of zero.

Setting of one line cycle is realized by setting the value of the frequency dividing ratio of the frequency dividers 105aa and 105ab set for the PLL circuit 105a as a value corresponding to a value set as the one line cycle.

After performing the initial setting, the peak detecting unit 202_1 detects a peak-bottom difference, by setting the DAC setting value to zero (Step S2). In this case, the peak detecting unit 202_1, as described with reference to FIGS. 8A and 8B, detects a peak-bottom difference from the distribution in the main-scanning direction, after the averaging processing is performed on the pixels in the sub-scanning direction, to reduce the random noise component. To do so, the CPU 203 sets the number of lines and the like to cause the peak detecting unit 202_1 to detect a peak-bottom difference. The peak-bottom difference detected here is stored in Δ_0_nch as a variable. To use the method for detecting the peak-bottom difference, one line cycle at the initial setting at Step S1 is set to integral multiple of the modulation cycle of the SSCG.

The peak-bottom difference is detected while the DAC setting value is set to 255 (Steps S3 and S4).

DAC setting value_nch←255

Even if the DAC setting value of the DAC 108b is set to 255, similar to Step S2, the image data is read and the peak detecting unit 202_1 detects a peak-bottom difference in the main-scanning direction, thereby storing the peak-bottom difference in the variable Δ_255_nch.

The DAC setting value of a correction signal is calculated from the detected peak-bottom differences of Δ_0_nch and Δ_255_nch (Step S4).

$$\text{DAC setting value} = 255 \times \Delta\_0\_nch / (\Delta\_0\_nch + \Delta\_255\_nch)$$

After setting the calculated DAC setting value to nch of the DAC 108b, the line cycle and the AFE gain changed during the initial setting are returned to normal setting values, thereby finishing the process (Step S6).

By calculating a DAC setting value based on the DAC setting value calculation flowchart described above, it is possible to obtain the setting value A suitable for reducing the offset variation due to the effect of the SSCG. As a result, it is possible to reduce the streaks that appear on an image.

In the processing illustrated in FIG. 11, the peak detecting unit 202_1 performs the method for detecting the peak-bottom difference described with reference to FIGS. 8A and 8B. Accordingly, the variation modes of the offset component at each line due to the SSCG modulation must be aligned. Consequently, at Step S1, one line cycle is set to the integral multiple of the modulation cycle of the SSCG. However, as the method for detecting the peak-bottom difference performed by the peak detecting unit 202_1, the method described with reference to FIGS. 9A and 9B can also be used. In this case, one line cycle need not be set to the integral multiple of the modulation cycle of the SSCG at Step S1, but for example, one line cycle may be set to a normal setting value as at Step S6.

The offset variation due to the effect of the SSCG is largely affected by the device characteristics of the CCD line image sensor 101. Accordingly, the offset variation amount may be changed depending on the temperature characteristics and the like. Consequently, in an image reading apparatus using such the CCD line image sensor 101, the optimal value for the DAC setting value is set by using the DAC setting value calculation flowchart described above, and even if the steaks on the image are reduced, because the offset variation amount due to the effect of the SSCG changes over the time, the streaks due to the effect of the SSCG may appear again on the image.

Even in such a case, by performing the DAC setting value calculation process described above at arbitrary time intervals in system processing, it is possible to correspond to the change of the offset variation amount due to the effect of the SSCG over the time.

For example, by providing a mode in which a continuous electrical connection time is monitored in an image reading apparatus including the functions of the present embodiment, and performing the DAC setting value calculation process described above at predetermined time intervals, the present embodiment can correspond to the change of the offset variation due to the effect of the SSCG over the time.

It is also possible to form an image based on image information in which streaks due to the effect of the SSCG are reduced, in the image forming apparatus including the image reading apparatus according to the present embodiment.

As described above, with this image reading apparatus, it is possible to reduce a streak image relative to a problem of the streak image in the reading apparatus using the SSCG.

By using the characteristics of the amplification unit for setting the process of calculating a setting value by feeding back, it is possible to obtain a suitable setting value using an easy process.

By using the feature amount obtained through the same image processing path as that of the normal image reading operation while generating a correction signal, it is possible to generate a correction signal without adding a structure for extracting the feature amount.

By providing a structure by which a correction signal can be set at an arbitrary amplification factor and the inversion or the non-inversion of the phase can be arbitrarily set during the generation of a correction signal, it is possible to correct the offset variations due to the effect of the SSCG, even if the offset variations fluctuate among devices. By using a general DAC, the structure can be realized at a low cost.

By extracting an analog signal in synchronization with the modulation cycle of the SSCG from a PLL block provided in the timing generator for generating a CCD drive signal, it is possible to extract an analog signal in synchronization with the modulation cycle of the SSCG, without newly providing a complicated circuit.

In an image reading apparatus using an analog ASIC in which the analog processing and the A/D conversion processing performed on an image signal are implemented in an integrated circuit, it is possible to reduce a streak image due to the effect of the SSCG.

When a correction signal generated for reducing streaks due to the effect of the SSCG is superimposed on the image signal, it is possible to reduce the streaks due to the effect of the SSCG without newly providing a complicated circuit, by superimposing the correction signal on a clamp potential of the analog processing ASIC through an AC coupling.

Even if a streak image due to the effect of the SSCG changes over the time, it is possible to perform correction by adjusting the streak image separately from the other controls in the image reading apparatus.

It is also possible to provide an image forming apparatus including the image reading apparatus in which the effect of the SSCG is reduced.

A computer program of the DAC setting value calculation flowchart of the invention may be stored in a storage unit such as a read only memory (ROM), a hard disk drive (HDD), or a solid state drive (SSD) provided with the CPU 203 of the substrate controlling unit 200 from the very start. However, the computer program of the DAC setting value calculation flowchart may be provided by storing into a recording medium such as a compact disk-read only memory (CD-ROM), a flexible disk, a magneto optical (MO), a compact disk-recordable (CD-R), a compact disk-rewritable (CD-RW), a digital versatile disk plus recordable (DVD+R), a digital versatile disk plus rewritable (DVD+RW), a digital versatile disk-recordable (DVD-R), a digital versatile disk-rewritable (DVD-RW), or a digital versatile disk-random access memory (DVD-RAM). The computer program of the DAC setting value calculation flowchart may also be provided by storing into a non-volatile recording medium (memory) such as a static random access memory (SRAM), a non-volatile random access memory (NOV-RAM), an electrically erasable and programmable read only memory (EEPROM), and a memory card. The procedures described above can be executed, by installing the computer program recorded on the memory in the computer and causing the CPU 203 to execute the program, or causing the CPU 203 to read the computer program from the memory and execute the program.

The computer program can also be executed by downloading from external equipment connected to a network and that includes a recording medium in which the computer program is recorded, or from external equipment having a storage unit in which the computer program is stored.

The configurations of the embodiments and the modifications described above may be appropriately combined within the scope of the present invention.

In the image reading apparatus and the image forming apparatus of the invention as described above, even if offset variations due to the effect of the SSCG fluctuate among devices bring about a streak image that appears on an image of the reading apparatus using the SSCG, it is possible to advantageously and properly correct the effect of the SSCG that appears in the image reading signal Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus that converts light reflected from an original into an analog image signal by a photoelectric conversion element, that converts the obtained analog image signal, to which analog signal processing is applied, into a digital image signal by an analog-digital converter, and that outputs the digital image signal, the image reading apparatus comprising:
   a driving unit that drives the photoelectric conversion element by a clock whose frequency is modulated;
   a signal generating unit that generates an analog signal corresponding to a frequency change of the clock whose frequency is modulated;
   an amplification inversion unit that is capable of amplifying an alternating current component of the analog signal with an amplification factor by a setting value that is set from outside, and that is capable of switching the alternating current component between inversion and non-inversion;
   a signal superimposing unit that superimposes the analog image signal on an analog signal that is output from the amplification inversion unit; and
   a controlling unit that converts analog image signal that is superimposed by the signal superimposing unit into a digital image signal by using the analog-digital converter, and that controls the amplification factor and the inversion and non-inversion of the amplification inversion unit based on a feature amount that appears on the digital image signal,
   wherein the controlling unit uses a detection value of a peak-bottom difference of the digital image signal in a predetermined image area as the feature amount.

2. The image reading apparatus according to claim 1, wherein
   amplification inversion unit uses the setting value specified externally and an amplification factor of an input signal that have a linear relation.

3. The image reading apparatus according to claim 1, wherein
   the controlling unit detects the peak-bottom difference based on an average value of values read at each of reading positions for a plurality of lines of the digital image signal.

4. The image reading apparatus according to claim 1, wherein
   the controlling unit detects the peak-bottom difference based on a moving average value calculated based on values read at each of reading positions for the digital image signal.

5. The image reading apparatus according to claim 1, wherein
   the amplification inversion unit includes
      a reference signal generating unit that generates two analog signals having a same amplitude and reversed phase out of the analog signal, and
      a digital-analog converter by which the two analog signals generated by the reference signal generating unit are separately supplied as a reference voltage, and
   the amplification inversion unit switches a digital value to be set in the digital-analog converter so as to switch the amplification factor and the inversion or the non-inversion.

6. The image reading apparatus according to claim 5, wherein
   the reference signal generating unit includes a circuit element that has a frequency characteristic for further amplifying a high-frequency component of the analog signal.

7. The image reading apparatus according to claim 5, wherein
the photoelectric conversion element is divided into a plurality of channels,
the digital-analog converter of the amplification inversion unit includes a plurality of output channels, and
the digital-analog converter is a general-purpose converter capable of setting a digital value to each of the channels by a serial communication.

8. The image reading apparatus according to claim 1, wherein
the driving unit includes a phase locked loop (PLL) circuit for feeding a reference clock whose frequency is modulated, and
the signal generating unit generates an analog signal corresponding to a frequency change of the reference clock by performing a frequency-voltage conversion on a clock signal output from the PLL circuit.

9. An image reading apparatus that converts light reflected from an original into an analog image signal by a photoelectric conversion element, that converts the obtained analog image signal, to which analog signal processing is applied, into a digital image signal by an analog-digital converter, and that outputs the digital image signal, the image reading apparatus comprising:
a driving unit that drives the photoelectric conversion element by a clock whose frequency is modulated;
a signal generating unit that generates an analog signal corresponding to a frequency change of the clock whose frequency is modulated;
an amplification inversion unit that is capable of amplifying an alternating current component of the analog signal with an amplification factor by a setting value that is set from outside, and that is capable of switching the alternating current component between inversion and non-inversion;
a signal superimposing unit that superimposes the analog image signal on an analog signal that is output from the amplification inversion unit; and
a controlling unit that converts analog image signal that is superimposed by the signal superimposing unit into a digital image signal by using the analog-digital converter, and that controls the amplification factor and the inversion and non-inversion of the amplification inversion unit based on a feature amount that appears on the digital image signal,
wherein the driving unit includes a phase locked loop (PLL) circuit for feeding a reference clock whose frequency is modulated,
wherein the signal generating unit generates an analog signal corresponding to a frequency change of the reference clock by performing a frequency-voltage conversion on a clock signal output from the PLL circuit, and
wherein the frequency-voltage conversion is performed by a circuit for smoothing the clock signal output from the PLL circuit.

10. The image reading apparatus according to claim 1, wherein
a unit that applies the analog signal processing on the analog image signal and the analog-digital converter are formed on a same analog processing application specific integrated circuit (ASIC).

11. The image reading apparatus according to claim 10, wherein
the signal superimposing unit superimposes the analog signal output from the amplification inversion unit onto a clamp potential of the analog processing ASIC.

12. The image reading apparatus according to claim 1, wherein
the controlling unit is capable of adjusting a setting value for specifying the amplification factor and the inversion or the non-inversion to be set in the amplification inversion unit at an arbitrary timing.

13. An image forming apparatus comprising the image reading apparatus according to claim 1 as an image reading unit.

14. An image reading apparatus that converts light reflected from an original into an analog image signal by a photoelectric conversion element, that converts the obtained analog image signal, to which analog signal processing is applied, into a digital image signal by an analog-digital converter, and that outputs the digital image signal,
the image reading apparatus comprising:
means for driving the photoelectric conversion element by a clock whose frequency is modulated;
means for generating an analog signal corresponding to a frequency change of the clock whose frequency is modulated;
means for amplification inversion that is capable of amplifying an alternating current component of the analog signal with an amplification factor by a setting value that is set from outside, and that is capable of switching the alternating current component between inversion and non-inversion;
means for signal superimposing the analog image signal on an analog signal that is output from the means for amplification inversion; and
means for controlling that converts analog image signal that is superimposed by the means for signal superimposing into a digital image signal by using the analog-digital converter, and that controls the amplification factor and the inversion and non-inversion of the means for amplification inversion based on a feature amount that appears on the digital image signal,
wherein the means for controlling uses a detection value of a peak-bottom difference of the digital image signal in a predetermined image area as the feature amount.

* * * * *